(12) United States Patent
Langmann

(10) Patent No.: US 9,097,240 B1
(45) Date of Patent: Aug. 4, 2015

(54) FLUID PRESSURE BASED POWER GENERATION SYSTEM

(71) Applicant: David Philip Langmann, Rochester, NY (US)

(72) Inventor: David Philip Langmann, Rochester, NY (US)

( * ) Notice: Subject to any disclaimer, the term of this patent is extended or adjusted under 35 U.S.C. 154(b) by 0 days.

(21) Appl. No.: 13/782,419

(22) Filed: Mar. 1, 2013

Related U.S. Application Data

(60) Provisional application No. 61/757,315, filed on Jan. 28, 2013.

(51) Int. Cl.
| | | |
|---|---|---|
| *F02B 63/04* | (2006.01) | |
| *H02K 7/18* | (2006.01) | |
| *F16D 31/00* | (2006.01) | |
| *F16D 33/00* | (2006.01) | |
| *F16D 37/00* | (2006.01) | |
| *F16D 39/00* | (2006.01) | |
| *F03G 7/04* | (2006.01) | |

(52) U.S. Cl.
CPC ... *F03G 7/04* (2013.01); *H02K 7/18* (2013.01)

(58) Field of Classification Search
CPC ......... Y02E 10/38; Y02E 10/20; Y02E 10/28; F03B 13/262; F03G 7/04; F05B 2280/5001; F05C 2251/20; F04B 19/02; F04B 19/003
USPC ................. 290/43, 54, 1 A, 53; 60/325, 327
See application file for complete search history.

(56) References Cited

U.S. PATENT DOCUMENTS

| | | | | |
|---|---|---|---|---|
| 3,487,228 A | * | 12/1969 | Kriegel | 290/52 |
| 3,504,648 A | | 4/1970 | Kriedt | |
| 3,918,260 A | * | 11/1975 | Mahneke | 60/500 |
| 3,961,480 A | * | 6/1976 | West | 60/496 |
| 3,989,951 A | * | 11/1976 | Lesster et al. | 290/53 |
| 3,994,134 A | | 11/1976 | Molnar | |
| 4,185,464 A | * | 1/1980 | Rainey | 60/496 |
| 4,208,878 A | | 6/1980 | Rainey | |
| 4,486,667 A | * | 12/1984 | Srogi | 290/1 R |
| 4,532,431 A | * | 7/1985 | Iliev et al. | 290/4 R |
| 4,598,211 A | * | 7/1986 | Koruthu | 290/53 |
| 4,630,440 A | * | 12/1986 | Meyerand | 60/398 |
| 4,754,157 A | * | 6/1988 | Windle | 290/53 |

(Continued)

*Primary Examiner* — Tulsidas C Patel
*Assistant Examiner* — Charles Reid, Jr.
(74) *Attorney, Agent, or Firm* — Howard Zaretsky; Zaretsky Patent Group PC

(57) ABSTRACT

A novel and useful method and apparatus for generating power from pressure changes over time within a fluid. The apparatus comprises a housing (10), and a double-sided piston (12) subject to the forces brought about by the variations in pressure of the surrounding fluid and by a restoring force such as a spring (20) or other mechanism. The resulting motion of the piston is transferred to power a generator, or is used to directly perform work. The apparatus is particularly applicable to placement in the ocean or sea where the rise and fall of the tides create the variations of pressure that drive the piston within the housing. A rising tide presents a higher pressure against the face of the piston pushing it towards the back of the housing and opposing the restoring force mechanism. A falling tide presents a lower pressure against the face of the piston allowing the restoring force to move it towards the front of the housing. Energy is harvested from the movement of the piston in one or both directions either by connection to a turbine coupled to a generator or by a linkage attached to the piston that is connected to a mechanical load such as a generator, pump, etc.

23 Claims, 7 Drawing Sheets

(56) References Cited

U.S. PATENT DOCUMENTS

| | | | |
|---|---|---|---|
| 5,186,822 A * | 2/1993 | Tzong et al. | 210/122 |
| 5,349,819 A | 9/1994 | Margittai | |
| 5,426,332 A | 6/1995 | Ullman et al. | |
| 5,554,922 A | 9/1996 | Kunkel | |
| 5,955,790 A | 9/1999 | North | |
| 6,457,307 B1 * | 10/2002 | Feldman et al. | 60/398 |
| 6,647,716 B2 | 11/2003 | Boyd | |
| 6,765,307 B2 | 7/2004 | Gerber et al. | |
| 7,768,144 B2 | 8/2010 | North et al. | |
| 7,795,748 B2 * | 9/2010 | DeAngeles | 290/43 |
| 7,841,177 B1 * | 11/2010 | Detwiler | 60/497 |
| 7,911,073 B2 * | 3/2011 | Smith | 290/53 |
| 8,007,252 B2 * | 8/2011 | Windle | 417/331 |
| 2004/0251692 A1 * | 12/2004 | Leijon et al. | 290/42 |
| 2007/0075545 A1 * | 4/2007 | Wilson et al. | 290/1 R |
| 2011/0042954 A1 * | 2/2011 | Werjefelt | 290/53 |
| 2011/0221206 A1 * | 9/2011 | Milinkovic et al. | 290/1 R |
| 2011/0266810 A1 * | 11/2011 | McBride et al. | 290/1 A |
| 2012/0210705 A1 * | 8/2012 | McBride et al. | 60/327 |
| 2013/0033042 A1 * | 2/2013 | Fortier et al. | 290/54 |
| 2013/0088018 A1 * | 4/2013 | Kobayashi | 290/1 A |
| 2013/0152568 A1 * | 6/2013 | Modderno et al. | 60/327 |

\* cited by examiner

FLUID PRESSURE BASED POWER GENERATION SYSTEM

CROSS-REFERENCE TO RELATED APPLICATION

This application claims the benefit of U.S. Provisional Application Ser. No. 61/757,315, filed Jan. 28, 2013, incorporated herein by reference in its entirety.

FIELD OF THE INVENTION

This application relates to the generation of power from pressure changes occurring over time in fluids.

BACKGROUND OF THE INVENTION

Power generation derived from variations in the earth's natural environments is in its early stages, and several technologies have been proposed.

A large number of prior art devices seek to harness the energy of ocean waves or the tides by measuring the varying height of the water through the use of floats. The float assembly is typically tied to a mechanical device in order to store energy, or to provide kinetic energy to an electric generator. One disadvantage of this approach is that it requires a mechanical connection from the float assembly to a stable reference point, usually the ocean floor. This could only be implemented in relatively shallow water environments where the risk of an apparatus breakup would be great.

Another group of prior art devices seeks to harness tidal energy by inserting turbines in the path of tidal currents. This solution will work only in a relatively small number of locations, and necessitate a thorough understanding of all forces at these locations, along with an assumption that these forces will not change over time.

Another group of prior art devices relies on the building of reservoirs at different levels and exploiting the movement of current between reservoirs. This solution is limited to near shore construction.

A reasonable alternative to the above mentioned approaches is to employ a power generating device which is completely submerged, and does not employ floats, or otherwise need to be in contact with the water surface. This type of device normally exploits the differences in hydrostatic pressure which occur as a result of tidal, wave, or other natural activity in the ocean.

One example of a submerged wave energy power generating device is U.S. Pat. No. 4,630,440 to Meyerand. In Meyerand, a constant pressure fluid reservoir positioned on land is connected by a hose to the submerged wave machine, which consists of a water filled outer housing and a fluid filled inner flexible bladder. The housing includes an opening to the ocean which includes a turbine driving an electrical generator. In this way, variances in hydrostatic pressure caused by the waves cause a filling and collapsing of the bladder, thereby increasing and decreasing the volume of water in the housing. This causes an inflow and outflow of water from the housing through the turbine, which is caused to turn to and fro. The turbine drives a generator, creating electrical power. This arrangement must be located near the shore, limiting the size of the apparatus and the amount of power it might produce. The hose would be susceptible to the difficult weather conditions sometimes found along the seashore.

A second example is U.S. Pat. No. 5,349,819 to Margittai. This apparatus employs a pump driven by hydrostatic pressure on the downside and a flexible member on the upside to drive pressurized water through 3 check valves to a collection tank for later use in driving a turbine. In this arrangement the pump plunger must move vertically and water flow takes place in one direction only. The need for a sealed air chamber would make this device difficult to produce and operate at significant depths.

Most prior art focuses on exploiting one particular phenomenon to the exclusion of others. In the case of the harnessing of ocean energy, for example, very few solutions, if any, seek to incorporate lower frequency tidal and higher frequency wave effects. Most proposed solutions are also applicable only to the particular environments for which they were originally designed.

BRIEF SUMMARY OF THE INVENTION

The apparatus for generating power from pressure changes occurring over time in a fluid, in one embodiment, comprises a housing divided into two chambers separated by a moveable wall. The housing is submerged in the surrounding fluid. The first chamber is exposed to this fluid and thus the face of the moveable wall exposed to the first chamber is subject to the force resulting from the fluid pressure, which varies with the pressure of the fluid. This varying force is opposed by a restoring force in the second chamber which presses upon the moveable wall in the opposing direction. The resulting motion of the moveable wall is transmitted to a generator, which translates mechanical motion to electrical power.

BRIEF DESCRIPTION OF THE DRAWINGS FIGURES

Figure 3A:
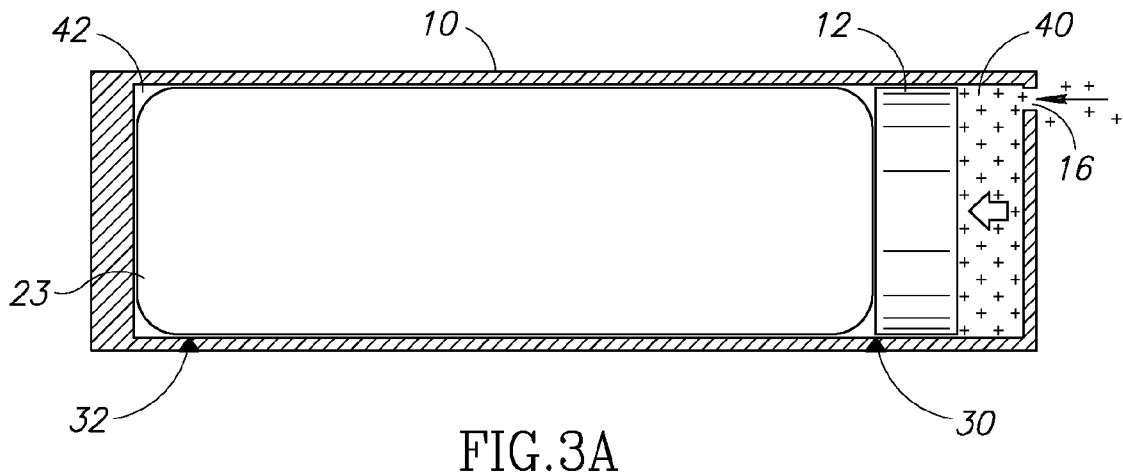
Figure 3B:
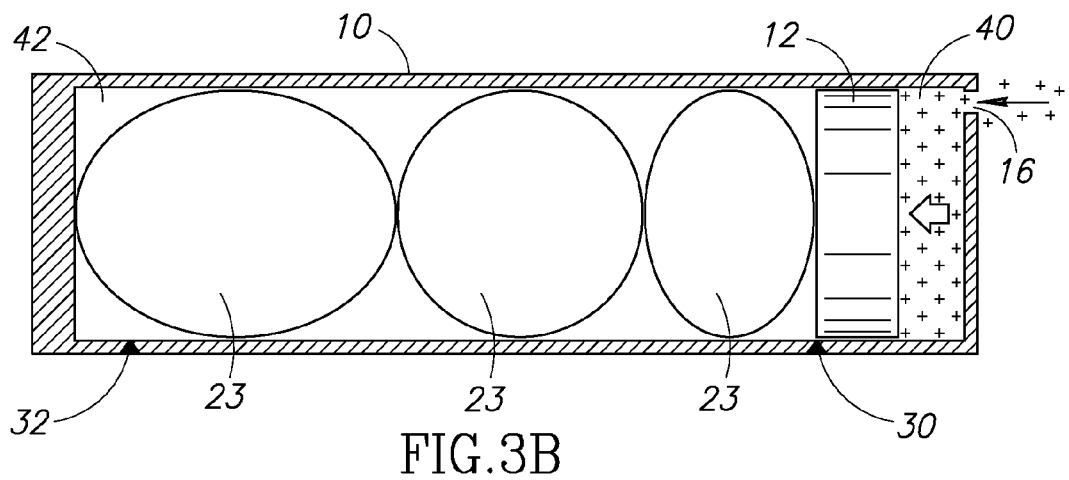

FIG. 3A is a cross sectional view of an embodiment type used to direct fluid through a turbine and which employs a compressible liquid or gas within a bladder as the restoring force. It shows the fluid and piston motion resulting from increasing fluid pressure, FIG. 3B is a cross sectional view of an embodiment type used to direct fluid through a turbine and which employs compressible liquid or gas within several bladders as the restoring force. It shows the fluid and piston motion resulting from increasing fluid pressure.

Figure 3C:
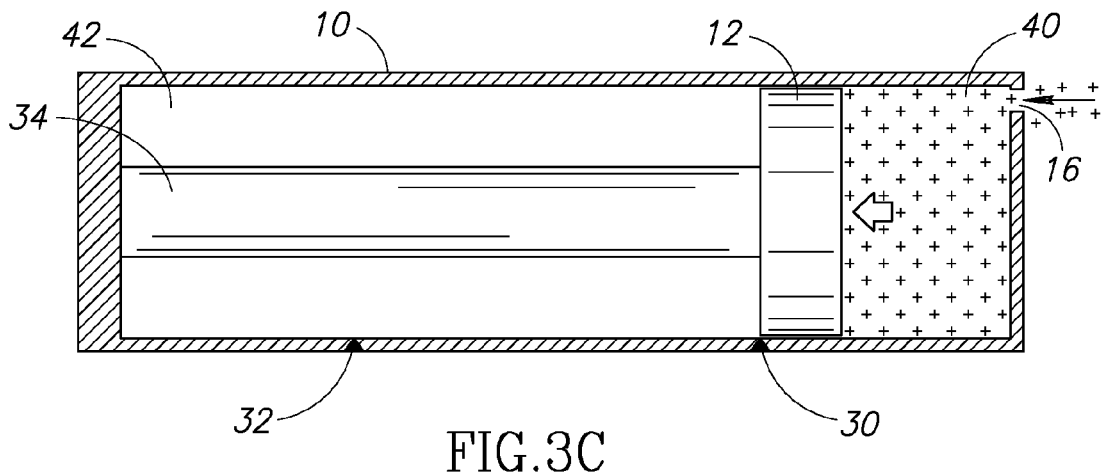

FIG. 3C is a cross sectional view of an embodiment type used to direct fluid through a turbine and which employs a material with the required elasticity as the restoring force. It shows the fluid and piston motion resulting from increasing fluid pressure.

Figure 3D:
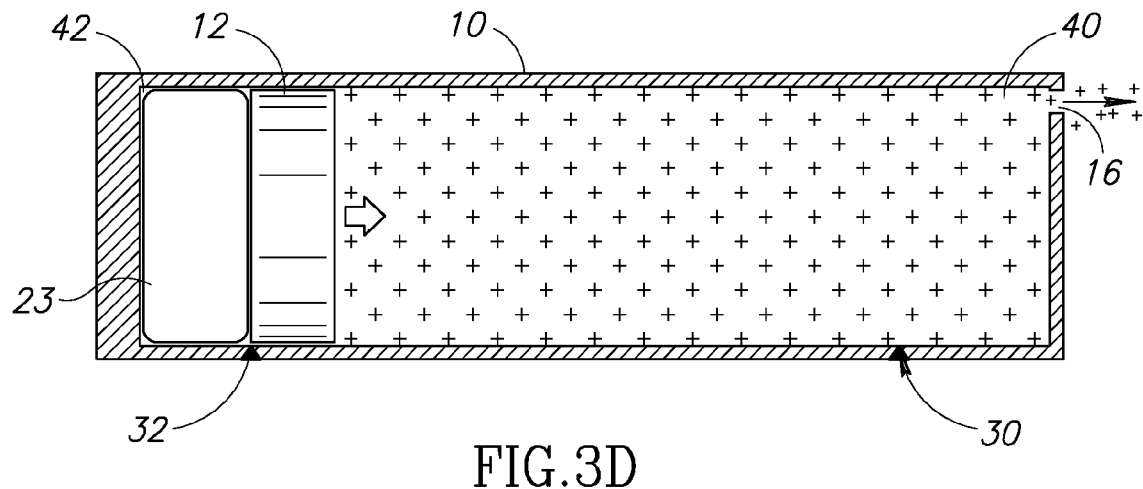

FIG. 3D is a cross sectional view of an embodiment type used to direct fluid through a turbine and which employs a compressible liquid or gas within a bladder as the restoring force. It shows the fluid and piston motion resulting from decreasing fluid pressure.

Figure 3E:
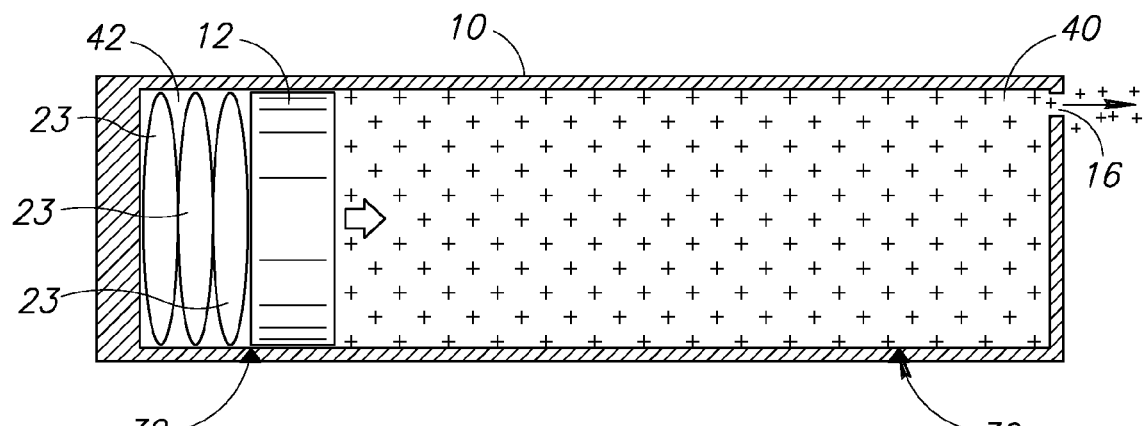

FIG. 3E is a cross sectional view of an embodiment type used to direct fluid through a turbine and which employs compressible liquid or gas within several bladders as the restoring force. It shows the fluid and piston motion resulting from decreasing fluid pressure.

Figure 3F:
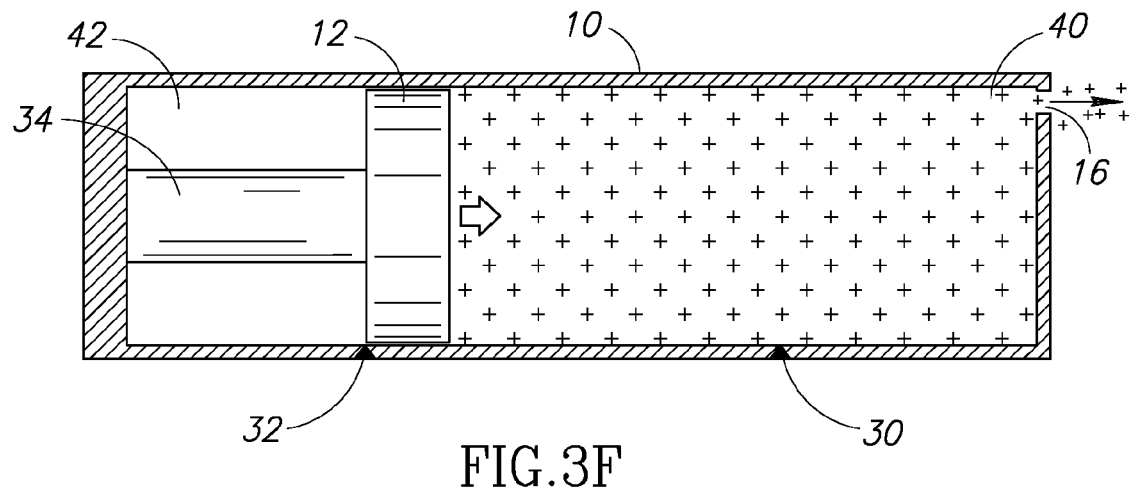

FIG. 3F is a cross sectional view of an embodiment type used to direct fluid through a turbine and which employs a material with the required elasticity as the restoring force. It shows the fluid and piston motion resulting from decreasing fluid pressure.

Figure 4A:
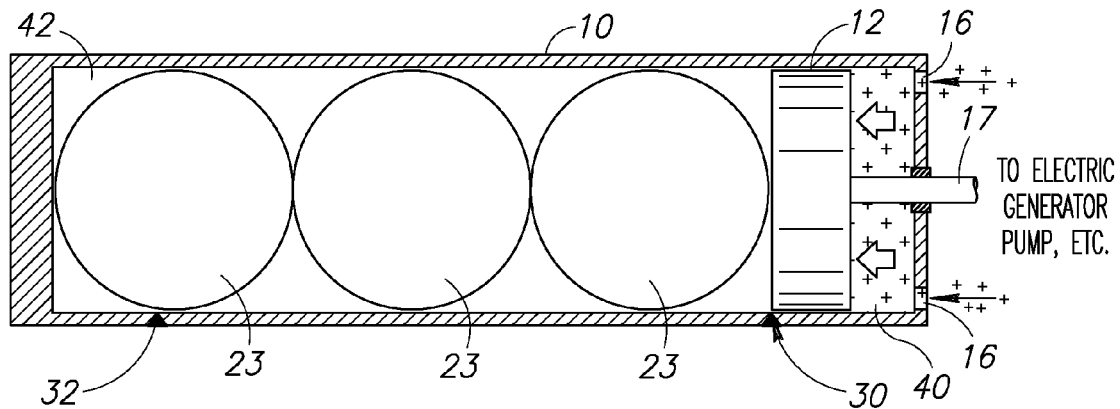

FIG. 4A is a cross sectional view of an embodiment type employing a linkage and which employs a compressible liquid or gas within several bladders as the restoring force. It shows the fluid and piston motion resulting from increasing fluid pressure.

Figure 4B:
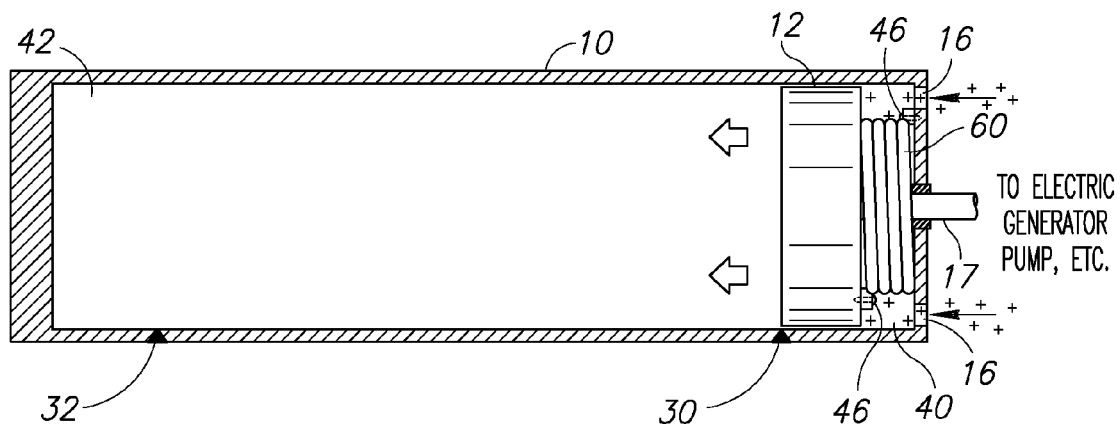

FIG. 4B is a cross sectional view of an embodiment type employing a linkage and which employs a spring within the fluid chamber as the restoring force. It shows the fluid and piston motion resulting from increasing fluid pressure.

Figure 4C:
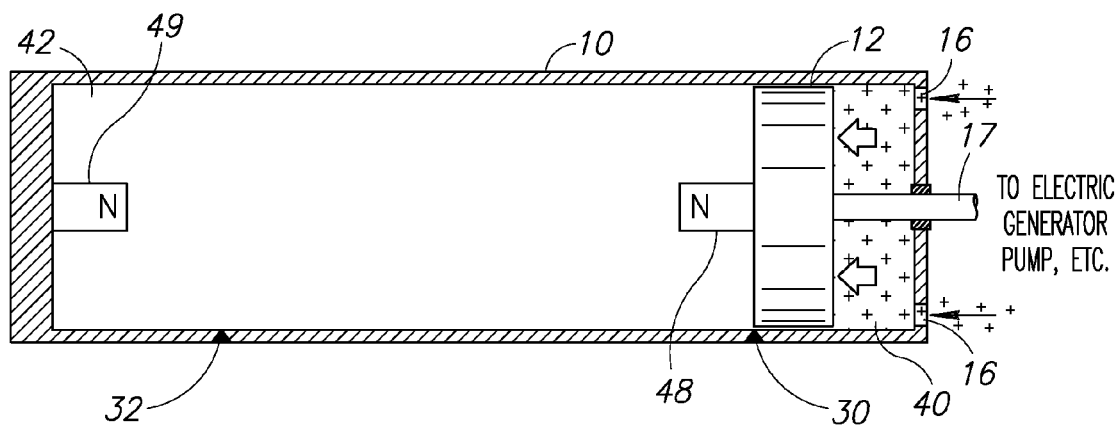
Figure 4D:
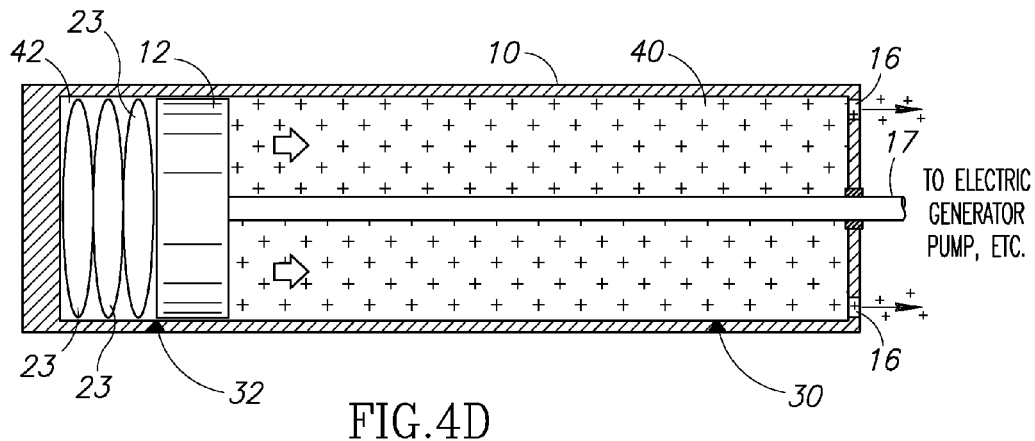

FIG. 4C is a cross sectional view of an embodiment type employing a linkage and which employs repelling magnets to provide the restoring force. It shows the fluid and piston motion resulting from increasing fluid pressure FIG. 4D is a cross sectional view of an embodiment type employing a linkage and which employs a compressible liquid or gas within several bladders as the restoring force. It shows the fluid and piston motion resulting from decreasing fluid pressure.

Figure 4E:
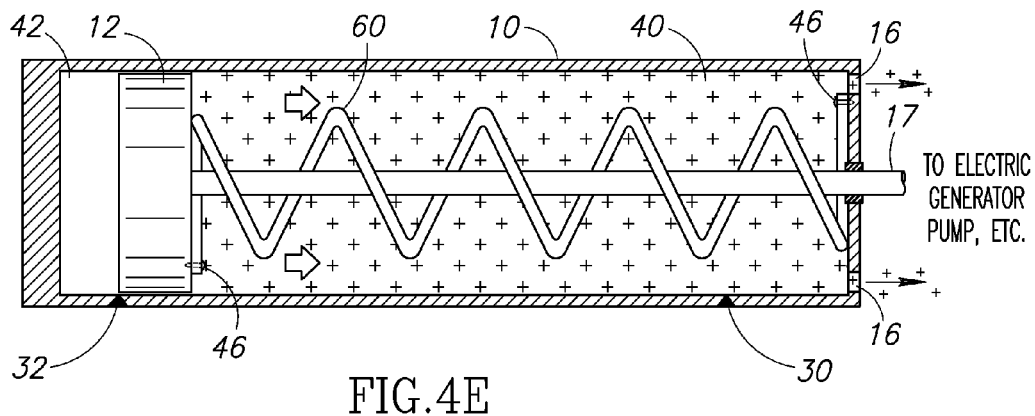
Figure 4F:
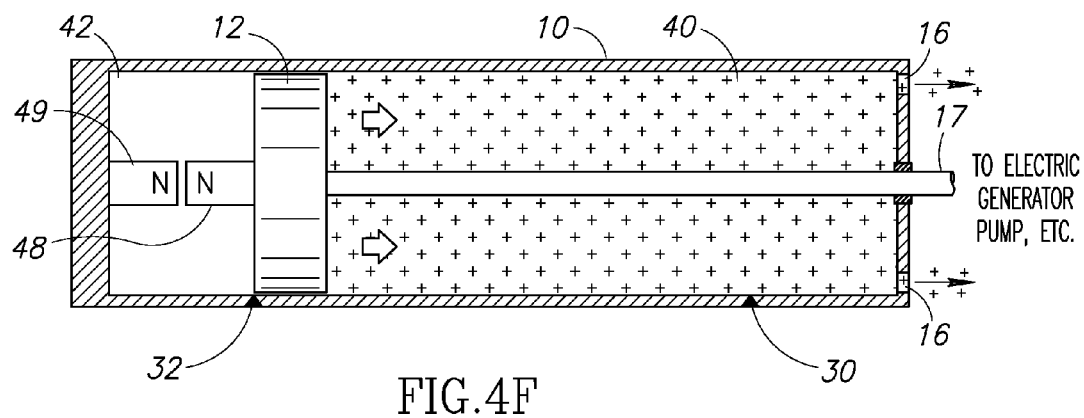

FIG. 4E is a cross sectional view of an embodiment type employing a linkage and which employs a spring within the fluid chamber as the restoring force. It shows the fluid and piston motion resulting from decreasing fluid pressure FIG. 4F is a cross sectional view of an embodiment type employing a linkage and which employs repelling magnets to provide the restoring force. It shows the fluid and piston motion resulting from decreasing fluid pressure.

REFERENCE NUMERAL TABLE

| Reference Numeral | Description | Reference Numeral | Description |
|---|---|---|---|
| 10 | Housing | 26 | Power Conditioning Unit |
| 12 | Piston or Moveable Wall | 30 | Minimum Mark |
| 16 | Opening | 32 | Maximum Mark |
| 17 | Linkage | 34 | Elastic Material |
| 20, 60 | Spring | 40 | Fluid Chamber |
| 21 | Compressible Liquid and/or Gas | 42 | Restoring Force Chamber |
| 22 | Turbine | 44 | Load |
| 23 | Bladder | 46 | Fastener |
| 24 | Generator | 48, 49 | Magnet |
| 54 | Fluid Surface | | |

DETAILED DESCRIPTION OF THE INVENTION

Figure 1A:
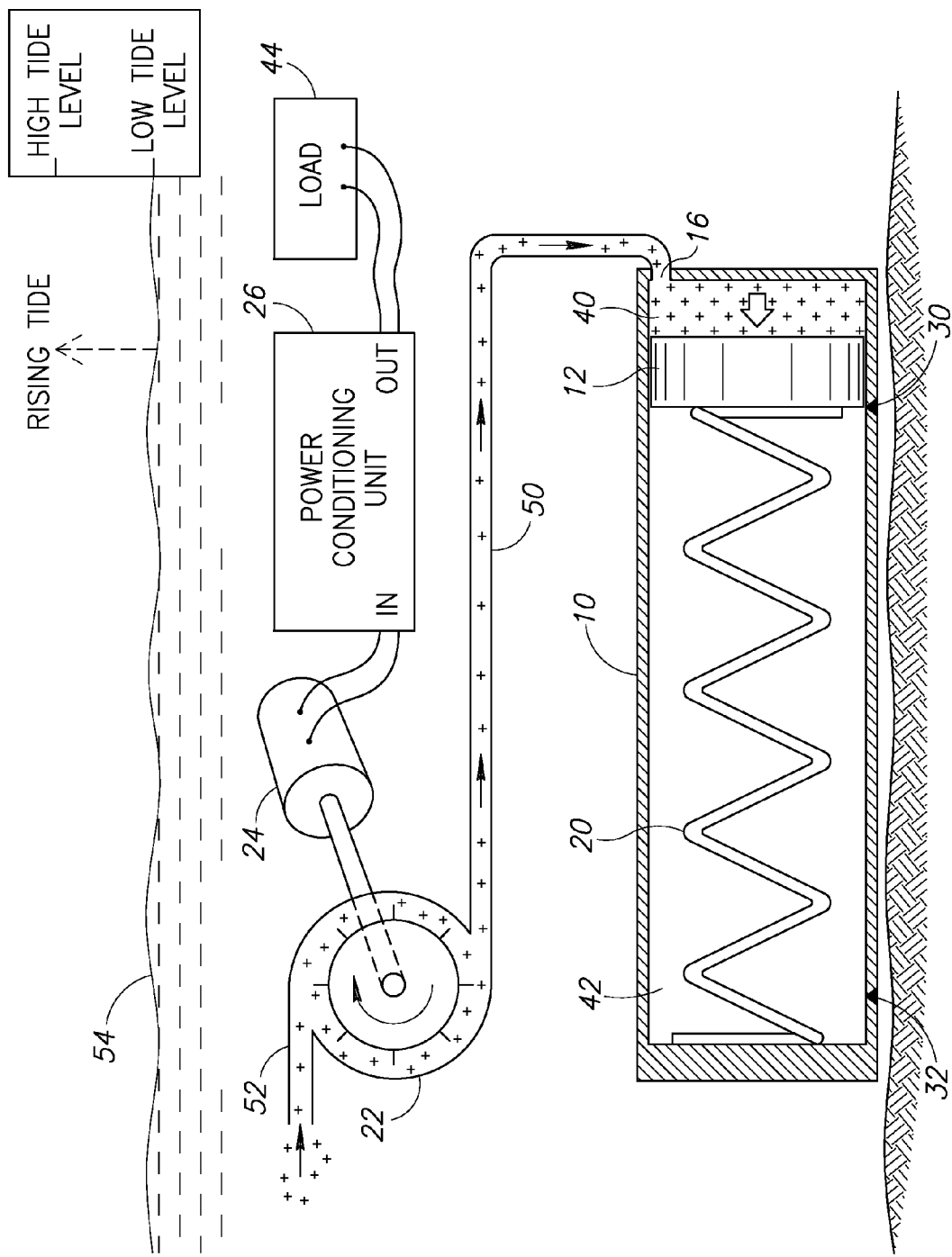
FIG. 1A is a cross sectional view of an embodiment directing fluid through a turbine and which employs a spring as the restoring force. It shows the fluid and piston motion resulting from increasing fluid pressure.

Referring to FIG. 1A, the apparatus for generating power comprises a rigid housing 10 containing a restoring force in the form of spring 20 next to which is placed a moveable wall, moveable double sided seal, or double sided piston 12. The term "piston" 12 will henceforth be used in this document to mean moveable wall, moveable double sided seal, or double sided piston. The chamber 42 containing the means of producing the restoring force and bordering the piston 12 will be referred to as the restoring force chamber. A piston shaft and piston shaft guide (not shown) may be needed in order to keep piston 12 stable in certain implementations. They need not be considered for understanding how the apparatus functions and are not pictured.

Figure 1B:
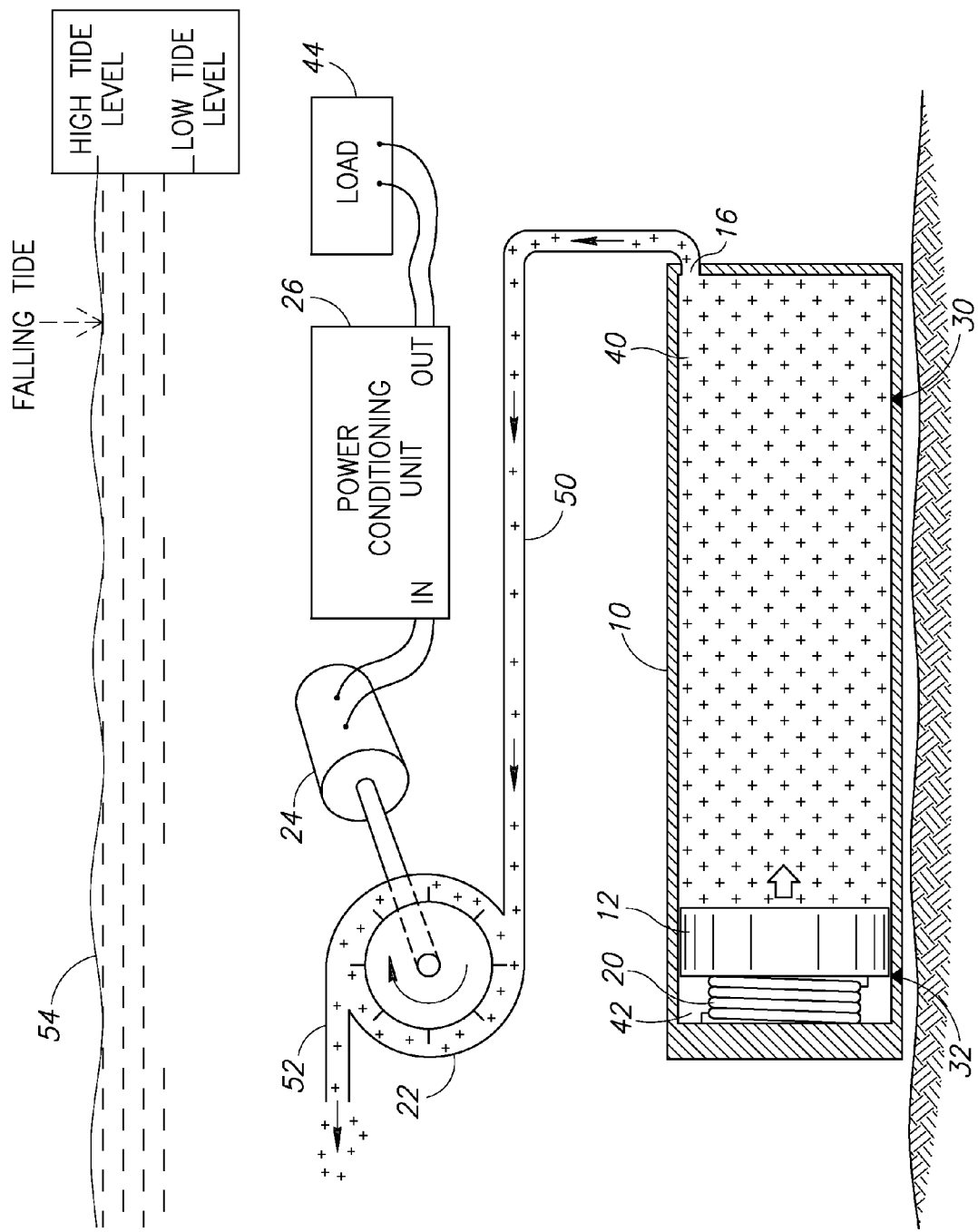
FIG. 1B is a cross sectional view of an embodiment directing fluid through a turbine and which employs a spring as the restoring force. It shows the fluid and piston motion resulting from decreasing fluid pressure.

The installed apparatus is shown in a horizontal position in FIG. 1A and FIG. 1B, but is not limited to that orientation. The range between a minimum mark 30 and a maximum mark 32 is a recommended range of travel of the piston 12. The term "fluid" will refer to the fluid in which the apparatus resides. For example, the fluid is seawater when the apparatus is operated in the sea. The surface of the surrounding body of fluid (e.g., the ocean or sea) is referenced 54 in the FIGS. 1A and 1B but is not shown for clarity sake in the subsequent Figures.

As will be shown, changes in fluid pressure in time, usually caused by a variety of natural factors, drive the operation of the apparatus. The fluid chamber 40 is in contact with the fluid, which is anticipated to be seawater in many cases, and is filled with this fluid through opening 16. The piston 12 provides an effective separation between the fluid chamber 40 and the restoring force chamber 42. The opening 16 in fluid chamber 40 is connected via pipe 50 to one side of turbine 22. The other side of turbine 22 is connected via pipe 52 to the surrounding fluid. Turbine 22 drives an electrical power generator 24. The output from the electrical power generator 24 is sent to the load 44 via the power conditioning unit 26. The power conditioning unit 26, if needed, modifies the electrical output of the generator 24. The turbine 22, the generator 24, and the power conditioning unit 26 may be installed in close proximity to or at a distance from housing 10. The load 44 may be an electrical distribution facility or storage unit, or one or more machines that consume electrical power.

The Regarding installation, the parameters of the apparatus are preferably optimally set for the particular installation. The location within the fluid at which the apparatus will be installed and the resulting average fluid pressure at that location are preferably understood through analysis or direct measurement. During installation, fluid chamber 40 is filled with fluid. In the case of seawater, the apparatus will typically be installed on the sea floor, or at some fixed distance from the sea floor. The tension of spring 20 is preferably such that piston 12 will travel freely in housing 10 within the range between minimum mark 30 and maximum mark 32 once the apparatus is installed. As the fluid pressure increases, piston 12 travels toward maximum mark 32. As the fluid pressure decreases, piston 12 travels toward minimum mark 30 because of the restoring force of spring 20.

The restoring force exerted by the spring 20 is in opposition to the force exerted by the fluid. In the case of the fluid being seawater, the force exerted by the fluid is proportional to the fluid pressure, which varies in proportion to the depth at which the apparatus resides within the fluid. At a fluid depth of 1 kilometer, for example, a much stronger force would be generated by the fluid pressure than at a fluid depth of 10 meters. The spring type must have the characteristics which will enable it to compress and expand such as to cause the piston 12 to travel between minimum mark 30 and maximum mark 32 under the pressures found at the installation depth.

Typical operation of the apparatus will now be described. As fluid pressure increases, as would happen in the case of seawater when the tide rises which would cause the level of the surface 54 to rise, pressure rises in fluid chamber 40 to equal the pressure outside the apparatus in the nearby fluid.

Fluid flows into pipe 52, and then into turbine 22, causing it to rotate. The fluid then flows into pipe 50 and into fluid chamber 40 via opening 16. Piston 12 is pushed in the direction of maximum mark 32, compressing spring 20. When the pressure of the surrounding fluid decreases, as would happen with a falling tide causing the level of the surface 54 to fall, pressure decreases in fluid chamber 40, and the force of the now compressed spring 20 pushes the piston 12 back toward the minimum mark 30. The force exerted by spring 20 may be calculated using well-known in the art Hooke's Law. Fluid flows out from the fluid chamber 40 via opening 16 to pipe 50 and then into the turbine 22, causing the turbine to rotate in the opposite direction, and then out through pipe 52. The rotation of the turbine 22 causes rotation of the attached generator 24, producing electric power.

The amount of power produced depends on several factors:
(a) All other factors being constant, the greater the sum of the pressure variations in a given time interval, the greater is the amount of power produced. For example, in the case where the fluid is seawater, a large change in tidal level and thus greater fluid pressure variation would generate more power than a small change in the tidal level, where the fluid pressure variation is less.
(b) All other factors being constant, the larger the apparatus, the greater the amount of power that can be generated. A larger cross-sectional area of the piston 12 and a greater distance of travel of piston 12 will result in a greater volume of fluid passing through the turbine 22 and a greater amount of generated power.

Figure 2A:
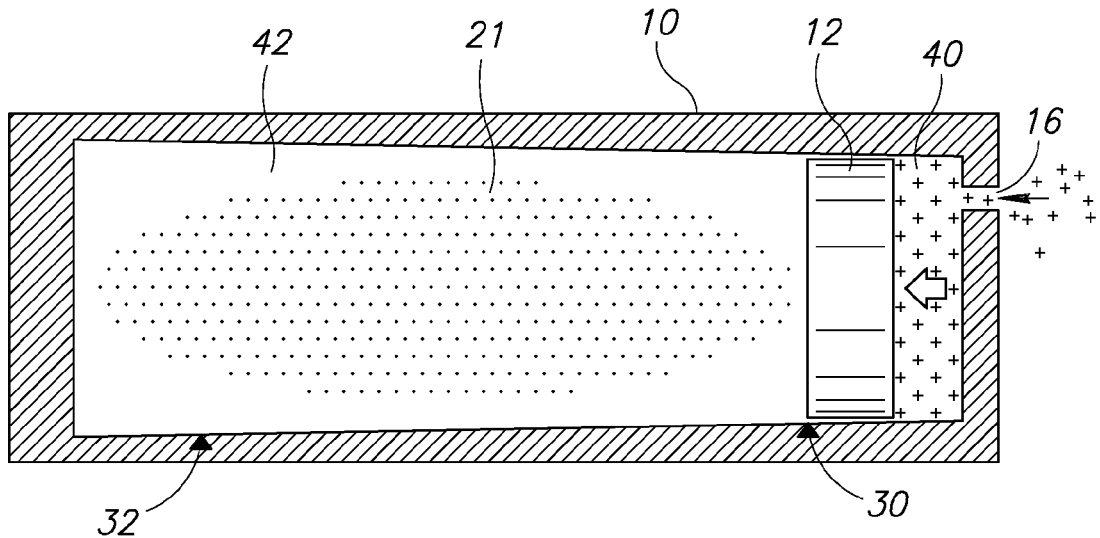
FIG. 2A is a cross sectional view of an embodiment type used to direct fluid through a turbine and which employs a compressible liquid or gas as the restoring force. It shows the fluid and piston motion resulting from increasing fluid pressure.
Figure 2B:
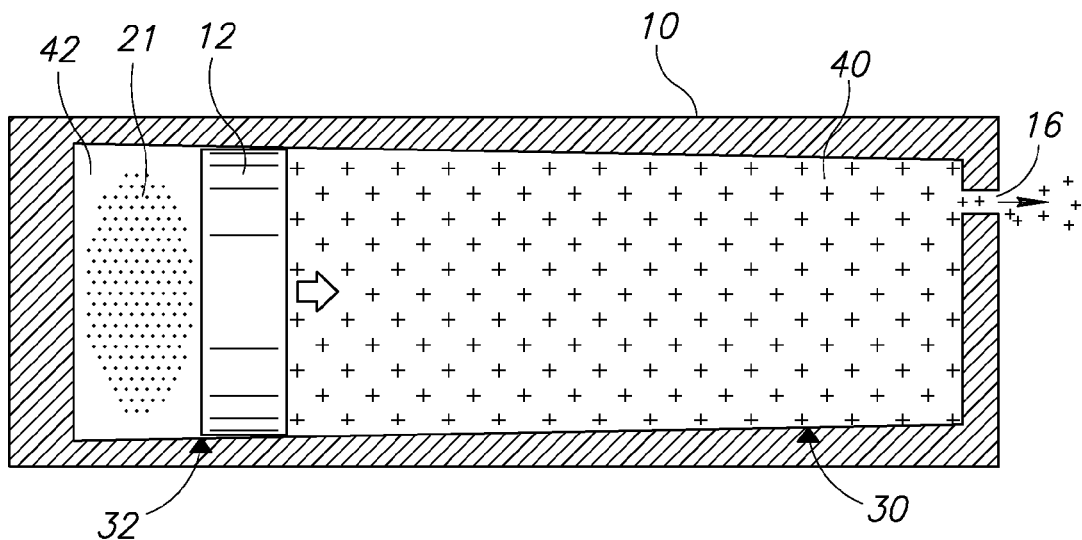
FIG. 2B is a cross sectional view of an embodiment type used to direct fluid through a turbine and which employs a compressible liquid or gas as the restoring force. It shows the fluid and piston motion resulting from decreasing fluid pressure.

Referring to FIG. 2A and FIG. 2B, a second embodiment consists of the same type of housing 10, but the restoring force within restoring force chamber 42 is a compressible liquid, compressible gas, or a combination of liquid and gas, henceforth identified as compressible liquid and/or gas 21. The piston 12 provides an effective seal between the fluid chamber 40 and the restoring force chamber 42 containing the compressible liquid and/or gas 21. In FIG. 2A and FIG. 2B, the walls in chambers 40 and 42 are drawn to show that they need not be parallel. Piston 12, however, must be capable of adjusting to the varying widths of the chambers 40 and 42, and provide an effective seal at its points of travel.

Consideration must be given to the location in the fluid at which the apparatus is to be installed. Fill restoring force chamber 42 in the housing 10 with the quantity and pressure of compressible liquid and/or gas 21 such that the following requirement is met: At the installation location, and as with the previous embodiment of FIGS. 1A and 1B, the range of travel of piston 12 during operation is preferably between minimum mark 30 and maximum mark 32.

With the apparatus installed, operation begins in similar fashion to the previous embodiment of FIGS. 1A and 1B, but with the compressible liquid and/or gas 21 providing the restoring force instead of spring 20. As fluid pressure increases, as would happen in the seawater case with a rising tide, fluid pressure increases in fluid chamber 40 to equal the pressure outside the apparatus in the nearby fluid. The resulting force on piston 12 drives it toward maximum mark 32, compressing the compressible liquid and/or gas 21. As fluid pressure decreases, pressure decreases in fluid chamber 40 and the force exerted by the now expanding compressible liquid and/or gas 21 moves piston 12 back toward minimum mark 30. The flow of fluid into and out of fluid chamber 40, and the resulting power production through turbine 22 are as previously described.

The distance traveled by piston 12, and the restoring force produced, can be calculated, given the materials used as the compressible liquid and/or gas 21, the dimensions of the apparatus, and the pressure variations of the fluid.

Referring to the embodiments shown in FIGS. 3A, 3D and FIGS. 3B, 3E, the compressible liquid and/or gas 21 is enclosed in one (see FIGS. 3A and 3D) or more (see FIGS. 3B and 3E) sealed bladders 23. The bladder or bladders 23 are in restoring force chamber 42. The use of a single bladder 23 presents some advantages over the previous, bladderless embodiment as the risk of leakage of the compressible liquid and/or gas 21 past piston 12 is reduced, and the use of a bladder 23 may simplify the construction and configuration of the apparatus. Furthermore, the use of multiple bladders may present advantages over the use of a single bladder: (a) The use of multiple bladders may be called for when there is the possibility of bladder leakage. With multiple bladders, leakage in a single bladder would not be as detrimental to the overall operation of the apparatus as it would in an apparatus equipped with a single bladder. (b) The use of multiple bladders would permit a mix of compressible liquids and gases to be used in the bladders. (c) The use of multiple bladders would be advantageous when housing 10 is very large, or of a certain geometry. (d) Several smaller bladders are typically easier to produce reliably than a single larger bladder.

The one or more bladders 23 containing the compressible liquid and/or gas 21 are in restoring force chamber 42. As the surrounding fluid pressure increases, as would happen in the seawater case with a rising tide, fluid pressure in fluid chamber 40 increases to equal the pressure outside the apparatus in the nearby surrounding fluid. The resulting force on piston 12 drives it toward maximum mark 32, compressing the one or more bladders containing compressible liquid and/or gas 21. As the surrounding fluid pressure decreases, pressure in fluid chamber 40 decreases and the force exerted by the now expanding bladder or bladders move piston 12 back toward minimum mark 30. Fluid entering or exiting the fluid chamber 40 causes turbine 22 to turn, driving electrical generator 24.

The embodiments described thus far differ in the type of restoring force they employ. The types of restoring force described are the spring 20 based type (shown in FIGS. 1A and 1B), the type based on compressible liquid and/or gas 21 (shown in FIGS. 2A and 2B), and the type based on one or more bladders 23 (shown in FIGS. 3A, 3B, 3D and 3E) containing a compressible liquid and/or gas 21. Other materials, such as many metals, possess spring-like characteristics internally as described by their elasticity and may also be used to supply the restoring force. The use of such materials, labeled as elastic material 34, is represented in FIG. 3C and FIG. 3F, where it is shown affixed at each end to housing 10 and piston 12. Piezoelectric materials may also provide the restoring force. Piezoelectric materials are further able to directly generate electric power from the changes in pressure.

Additional embodiments of the present invention will now be described in detail. In FIGS. 4A, 4B and 4C, housing 10 comprises a cavity divided into two chambers by piston 12. These two chambers include (a) the restoring force chamber 42, which contains the restoring force and (b) the fluid chamber 40, which is connected to the fluid surrounding the apparatus. As before, the connection of fluid chamber 40 to the surrounding fluid may be through one or more openings 16 in the wall of the fluid chamber 40. The restoring force may be of several types, including those described supra.

In these embodiments, a turbine is not employed. Instead, as shown in FIGS. 4A, 4B and 4C, a linkage 17 is connected to piston 12, or otherwise attached thereto in order to transfer the motion of piston 12. The linkage 17 serves to transfer the motion of piston 12 to do work. It can drive a linear electric generator, or more commonly, its motion can be converted to rotary motion, through a screw arrangement, or other means known to those skilled in the art, to drive a rotary electric generator. The linkage 17 may also be used to do direct work such as driving a pump. The flexibility of the use of linkage 17 would likely make this embodiment particularly useful in a wide variety of applications. The linkage 17 may comprise a mechanical linkage as shown in FIGS. 4A, 4B and 4C, or may use different material characteristics such as magnetism to transfer the motion of piston 12 at a distance.

In FIG. 4B, spring 60 resides in the fluid chamber 40 and is affixed to piston 12 on one end and to housing 10 on the other end with fasteners 46. In this embodiment, spring 60 stretches as fluid pressure increases. It is the consequent compression of spring 60 when fluid pressure decreases that provides the restoring force.

FIG. 4C shows one example of the use of magnetism to provide the restoring force. A first magnet 48 is affixed to piston 12 and a second magnet 49 is affixed to the end of restoring force chamber 42. Assuming like poles of magnets 48, 49 face each other, repelling force between these two magnets provides the restoring force.

The embodiments described thus far may be combined in various ways to yield embodiments of greater complexity but which nevertheless are based upon the same principles. Examples include embodiments employing two pistons 12 within a single housing 10, sandwiching a fluid chamber 40 between two restoring force chambers 42, or sandwiching a restoring force chamber 42 between two fluid chambers 40.

As the surrounding fluid pressure increases, the pressure in fluid chamber 40 increases to equal the pressure outside the apparatus in the nearby surrounding fluid. The resulting force on piston 12 drives it toward maximum mark 32. In the embodiment of FIGS. 4A, 4B and 4C, the provider of the restoring force in restoring force chamber 42 is compressed. In the embodiment of FIG. 4B, the provider of the restoring force is stretched. As fluid pressure decreases, pressure decreases in fluid chamber 40 and the force exerted by the restoring force moves piston 12 back toward minimum mark 30. The resulting back and forth motion of piston 12 is transferred to linkage 17 which in turn transfers that motion to perform work, either directly or by driving an electric generator.

From the description provided supra, several advantages of the described embodiments include the following:

(a) The apparatus is capable of operating on its own without external control. It can be used to provide power in remote locations, such as powering buoys in the ocean.

(b) The apparatus is self-contained in that it does not require floats or other references to operate.

(c) The apparatus is scalable. A larger unit should be able to produce more power.

(d) The methods and apparatus described herein are applicable to diverse fluid environments that experience changes in pressure, such as in the sea and the atmosphere.

As described in detail supra, the operation of the apparatus is based upon the countering of the force brought about by the fluid pressure with a restoring force. Subsystems which can provide this restoring force include those based on springs, compressible liquids, gasses, magnetic materials, or any combinations of materials and structures possessing the required elasticity.

In general, electrical power is presented to the load device in a manner consistent with the requirements of the load device. For example, a load such as a charging battery may require the electrical power to be in the form of a positive direct current. In some cases, a mechanical means of controlling the motion of the generator may be used to present the desired form of electrical power to the load. More generally, however, a power conditioning unit employing circuitry is used to convert the electrical output from the generator to the desired form. The particular implementation of the circuitry used will depend on the generator used as well as the particular requirements of the load device. The design and usage of power conditioning units and their circuitry is well known to those skilled in the art and it not described in detail herein.

Most of the discussion and examples in this document have focused on the operation of the apparatus in a fluid such as seawater. It is noted that an apparatus constructed based on this discussion and the corresponding drawings may be operated in other fluids. The atmosphere is a prominent example. In this case, the fluid is the local atmosphere and operation would be based on changes in barometric pressure instead of seawater pressure. A suitable embodiment for producing power from changes in the barometric pressure might comprise an embodiment described supra, such as an apparatus employing compressible gas within one or more bladders as the restoring force, and employing a linkage attached to the piston to drive an electric generator as shown in FIGS. 4A and 4D.

A number of embodiments of the invention have been described. Nevertheless, it will be understood that various modifications may be made without departing from the spirit and scope of the invention. Accordingly, other embodiments are within the scope of the following claims.

I claim:

1. A power generation apparatus, comprising:
   a housing submerged in a surrounding body of water and having inner walls defining an interior space therein, said housing having one or more openings operative to allow water flow between a first chamber and the surrounding body of water;
   a piston slideably disposed within said housing and operative to divide said interior space into said first chamber and a second chamber, edges of said piston being sealed against said inner walls of said housing thereby preventing water flow between said first chamber and said second chamber, said piston having a first side in communication with said first chamber and a second side opposite thereto in communication with said second chamber;
   wherein due solely to positive changes in pressure of the surrounding body of water exerted on said first side of said piston, said piston slideably moves within said housing to compress said second chamber;
   a restoring force member coupled to said piston whereby due solely to negative changes in pressure of the surrounding body of water exerted on said first side of said piston, said restoring force member exerts a force on said piston whereby said piston slideably moves within said housing to expand said second chamber;
   wherein said piston compresses said second chamber when the force exerted by the positively changing pressure of the surrounding body of water exceeds that exerted by said restoring force member;
   wherein said piston expands said second chamber when the force exerted by the negatively changing pressure of the surrounding body of water is less than that exerted by said restoring force member; and
   wherein said one or more openings are channeled to a mechanical load for transferring the energy generated by said piston to perform useful work.

2. The apparatus according to claim 1, wherein said restoring force member is disposed in said second chamber and connected to said second side of said piston.

3. The apparatus according to claim 1, wherein said restoring force member is disposed in said first chamber and connected to said first side of said piston.

4. The apparatus according to claim 1, wherein said one or more openings are connected via one or more pipes to a turbine coupled to an electrical generator, whereby energy generated by movement of said piston due to pressure changes in the surrounding body of water is converted to electricity by rotation of the turbine caused by the flow of water in the pipe.

5. The apparatus according to claim 1, further comprising a mechanical linkage connected to said piston and operative to transfer motion of said piston to a device for performing mechanical work.

6. The apparatus according to claim 5, wherein said mechanical work comprises driving an electric generator.

7. The apparatus according to claim 5, wherein said mechanical work comprises driving a pump.

8. The apparatus according to claim 1, wherein the movement of said piston within said chamber is due solely to changes in pressure of the surrounding body of water and not to any mechanical linkages extending to the surface of said body of water.

9. The apparatus according to claim 1, wherein the positive and negative changes in pressure are caused by said housing rising and falling in said water.

10. The apparatus according to claim 1, wherein the positive and negative changes in pressure are caused by the natural phenomena of waves in an ocean.

11. The apparatus according to claim 1, wherein the positive and negative changes in pressure are caused by the natural phenomena of tides in an ocean.

12. The apparatus according to claim 1, wherein said apparatus is disposed in the ocean or sea, wherein the natural phenomena of a rising tide causes pressure derived forces against the first side of said piston to increase and wherein the natural phenomena of a falling tide causes pressure derived forces against the first side of said piston to decrease.

13. The apparatus according to claim 1, further comprising a mechanical linkage and mechanism connected to said piston on one end and connected to an electrical generator or pump on the other end and operative to convert reciprocal motion of said piston into rotary motion for the generator or pump.

14. The apparatus according to claim 1, wherein one or more operating parameters of said restoring force member are configured such that the distance traveled by said piston in said housing is an optimal length.

15. The apparatus according to claim 1, wherein the force exerted by the surrounding body of water is proportional to fluid pressure which varies in accordance with a depth of said apparatus within the surrounding body of water.

16. The apparatus according to claim 1, wherein said restoring force member comprises one of the following: a compressible gas or liquid, one or more bladders, one or more springs, one or more magnets, one or more sections of elastic material and one or more pieces of piezoelectric material.

17. A method of generating power, the method comprising:
submerging a housing in a surrounding body of water, said housing having inner walls defining an interior space therein and having one or more openings operative to allow water flow between a first chamber and the surrounding body of water;
disposing a piston within said housing dividing said interior space into said first chamber and a second chamber, said piston having a first side in communication with said first chamber and a second side opposite thereto in communication with said second chamber;
sealing edges of said piston against said inner walls of said housing thereby preventing water flow between said first chamber and said second chamber;
wherein due solely to positive changes in pressure of the surrounding body of water exerted on said first side of said piston, said piston slideably moves within said housing to compress said second chamber;
providing a restoring force member coupled to said piston whereby due solely to negative changes in pressure of the surrounding body of water exerted on said first side of said piston, said restoring force member exerts a force on said piston whereby said piston slideably moves within said housing to expand said second chamber;
channeling said one or more openings to a mechanical load for transferring the energy generated by said piston to perform useful work;
wherein said piston compresses said second chamber when the force exerted by the increasing pressure of the surrounding body of water exceeds that exerted by said restoring force member; and
wherein said piston expands said second chamber when the force exerted by the decreasing pressure of the surrounding body of water is less than that exerted by said restoring force member.

18. The method according to claim 17, further comprising converting movement of said piston due to pressure changes in the surrounding body of water to electricity by rotation of a turbine, wherein said one or more openings of said housing are connected by way of pipe to the turbine which is coupled to an electrical generator.

19. The method according to claim 17, further comprising transferring motion of said piston to a device for performing mechanical work via a mechanical linkage connected to said piston.

20. The method according to claim 17, wherein the surrounding body of water comprises seawater, wherein the natural phenomena of a rising tide causes pressure derived forces against the first side of said piston to increase and wherein the natural phenomena of a falling tide causes pressure derived forces against the first side of said piston to decrease.

21. An apparatus for generating power for use in an ocean or sea, comprising:
a closed hollow housing submersible in a surrounding body of seawater undergoing water pressure variations over time caused by natural phenomena of rising and falling tides in the ocean or sea, said closed hollow housing including at least one completely submersible opening through which seawater from the surrounding body of water enters and exits said closed hollow housing;
at least one moveable wall with a first face and a second face opposite said first face, said at least one moveable wall operative to partition said closed hollow housing into a first chamber and a second chamber;
wherein fluid from the surrounding body of water fills the first chamber of said closed hollow housing and wherein the second chamber of said closed hollow housing is sealed from contact with seawater by said at least one moveable wall;

wherein the first face of said at least one moveable wall in contact with seawater in said first chamber of said closed hollow housing;

wherein a first force, caused solely by increased pressure in the surrounding body of water due to a rising tide is applied against the first face of said at least one moveable wall;

a restoring force subsystem operative to provide a second force in opposition to the first force being applied against the first face of said at least one moveable wall and to cause said at least one moveable wall to move in an opposite direction caused solely by decreased pressure in the surrounding body of water due to a falling tide;

wherein said moveable wall compresses said second chamber when the force exerted by the increasing pressure of the surrounding body of water exceeds that exerted by said restoring force member;

wherein said moveable wall expands said second chamber when the force exerted by the decreasing pressure of the surrounding body of water is less than that exerted by said restoring force subsystem; and wherein power is generated through harnessing the first force and the second force to do useful mechanical work.

22. The apparatus according to claim 21, wherein said one or more openings are connected via one or more pipes to a turbine coupled to an electrical generator, whereby energy generated by movement of said at least one moveable wall due to pressure changes in the surrounding body of water is converted to electricity by rotation of the turbine caused by the flow of water in the one or more pipes.

23. The apparatus according to claim 21, further comprising a mechanical linkage connected to said at least one moveable wall and operative to transfer motion thereof to a device for performing mechanical work.

* * * * *